UNITED STATES PATENT OFFICE.

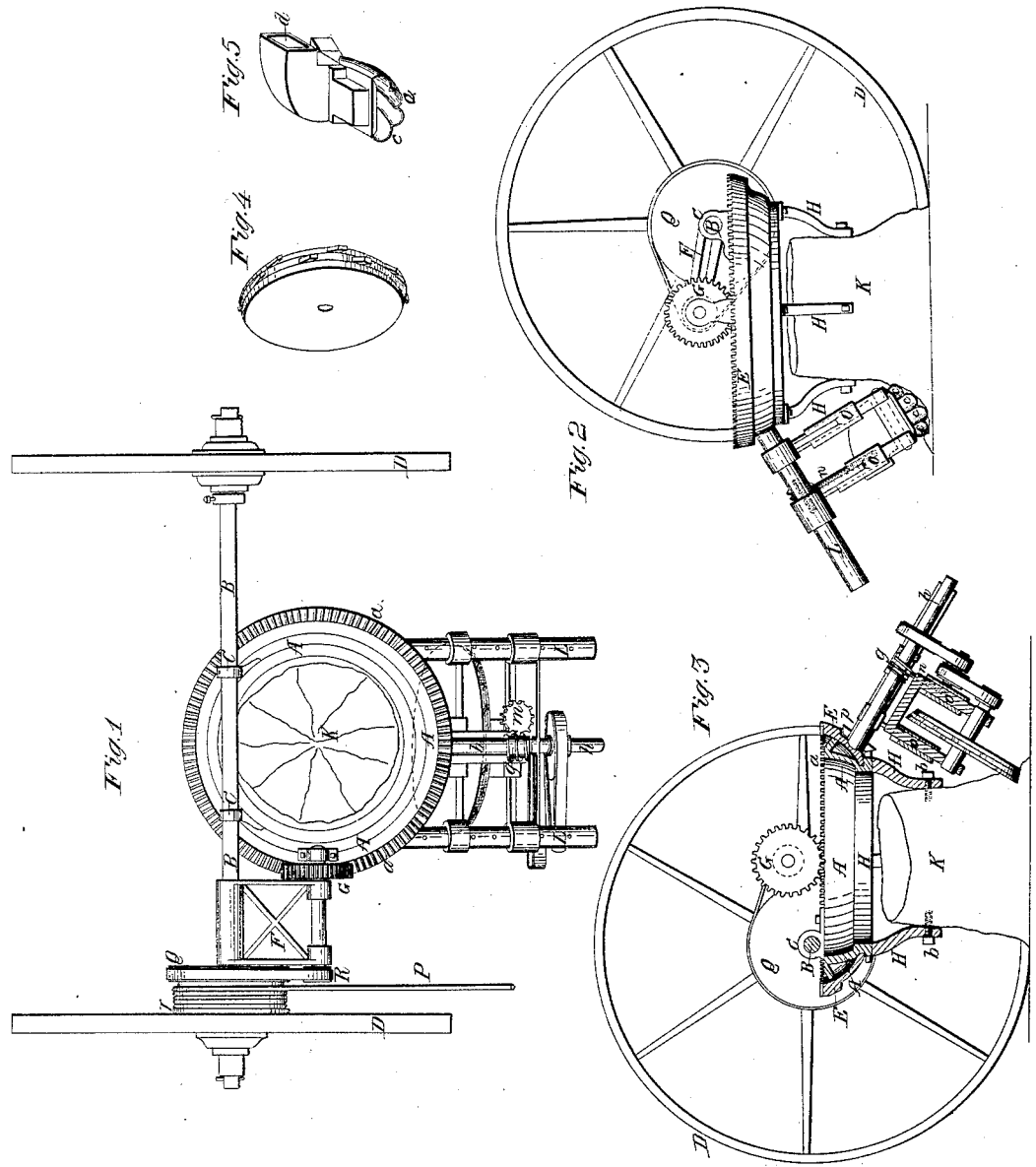
F. Kettler,
Cutting Tree Stumps.
N° 20,494.  Patented June 8, 1858.

F. KETTLER, OF MILWAUKEE, WISCONSIN.

MACHINE FOR CUTTING OUT STUMPS.

Specification of Letters Patent No. 20,494, dated June 8, 1858.

*To all whom it may concern:*

Be it known that I, FREDERIC KETTLER, of Milwaukee, in the county of Milwaukee and State of Wisconsin, have invented new and useful Improvements in Machines for Cutting Down Stumps Close to their Roots for the Purpose of Clearing the Land; and I do hereby declare that the following is a clear, full, and exact description of the construction and operation of the same, reference being had to the accompanying drawings, in which—

Figure 1 represents a top view of said machine. Fig. 2 represents a side view of the same. Fig. 3 represents a vertical cross section through the same. Figs. 4 and 5 represent the cutting tools hereafter to be described.

To enable others skilled in the art to make and use my invention I will proceed to describe its construction and operation.

A represents a circular frame which is hung upon the shaft, B by means of the hubs C; the shaft B is supported by the wheels D.

E represents a circular ring which is formed on its upper face with cogs $a$; the ring E rests within a groove on the circumference of the frame A and can be turned therein.

F, represents a bracket which is hung upon the shaft B. This bracket supports the shaft of the wheel G which is in gear with the toothed ring E.

H represents four arms which extend downward from the lower face of the frame A and which when the machine is set in its place come to bear against the sides of the stump which is to be operated upon; these arms are secured to the stump K, by means of the screws J.

L represents two bars extending from the side of the movable ring E, these bars support the cutting tool. I make use of two kinds of cutters according to circumstances; the revolving cutter M Fig. 4, I use in gravelly soil, while the stationary cutter N, Fig. 4 may be employed in such places where its cutting edges C, will not come in contact with stone or gravel; the shape of the latter cutter may be seen in Fig. 4; it is made hollow the chips passing through its interior and escape by the opening, $d$. The cutter in either case is secured to sliding frame O, which is suspended to the bars L, and the feed is imparted to said cutter by means of the wormwheel, $g$, on shaft, $h$, which meshing into wheel, $m$, thereby operates the screws, $n$, and feeds the cutting tool to its work. The shaft, $h$, may be operated by means of a cogged wheel $p$ shown in red in Fig. 2, which meshes into the cogs on the circumference of the rim A.

The operation of the machine is as follows: The apparatus is moved on the wheels D to the desired place and so that the arms H, embrace the stump on four sides as represented in Figs. 2 and 3 the apparatus is then secured to the stump by means of the screws J. A horse is then hitched to the end of the rope P, which passes over the drum, $r$, and said drum is rotated thereby rotating the pulley Q, which imparts rotary motion to pulley R, and wheel G which latter operates the rim E, causing the latter together with the braces L, to turn on the frame A. By this motion the cutter is carried around the base of the stump and the feed thereof being effected as above described the stump is cut or notched to any desired depth.

Having thus fully described the nature of my invention, what I claim therein as new and desire to secure by Letters Patent is:

The circular frame A, and the revolving frame E in combination with the cutting apparatus, substantially in the manner and for the purposes set forth.

FRED. KETTLER.

Witnesses:
F. HOUSAM,
A. KEESEKER.